(No Model.)

B. C. & R. A. TILGHMAN.
MACHINE FOR ORNAMENTING GLASS BY MEANS OF THE SAND BLAST.

No. 415,230. Patented Nov. 19, 1889.

WITNESSES:
Henry Drury
David S. Williams

INVENTORS
Benjamin C. Tilghman
Richard A. Tilghman
by their attorney
Francis T. Chambers N. PETERS. Photo-Lithographer, Washington, D. C.

UNITED STATES PATENT OFFICE.

BENJAMIN C. TILGHMAN AND RICHARD A. TILGHMAN, OF PHILADELPHIA, PENNSYLVANIA.

MACHINE FOR ORNAMENTING GLASS BY MEANS OF THE SAND-BLAST.

SPECIFICATION forming part of Letters Patent No. 415,230, dated November 19, 1889.

Application filed March 16, 1889. Serial No. 303,571. (No model.)

*To all whom it may concern:*

Be it known that we, BENJAMIN C. TILGHMAN and RICHARD A. TILGHMAN, both of the city and county of Philadelphia, State of Pennsylvania, have invented a new and useful Improved Machine for Ornamenting Glass by Means of the Sand-Blast, of which the following is a true and exact description, reference being had to the accompanying drawings, which form a part of this specification.

Our invention relates to the construction of mechanism for carrying out the ornamentation of glass by means of the sand-blast, our object being to secure a finer frosted surface on the glass than has heretofore been obtainable, to increase the rapidity with which the frosting of the glass can be effected, and the ease and certainty with which the glass can be manipulated while exposed to the blast.

Heretofore in frosting or grinding the surface of glass by means of the sand-blast a surface has been produced so uneven and coarse in grain that when subsequently exposed to the action of fluoric acid to remove the frosting it was impracticable to obtain a perfectly smooth and brilliant surface. This was the case with the finest particles of sand which could be used in a dry state in a sand-blast gun, and the grinding action with very fine sand was, besides, found to be very slow. We have discovered that by using sand in the form of a fine powder—of such fineness, for instance, as flour—and by mixing it with water, so as to form a thoroughly fluid mud, and using this mud in the sand-blast, a frosting of exceedingly fine grain can be obtained with great rapidity, the surface being so fine that when subsequently treated with fluoric acid a smooth and brilliant surface of plain glass is obtained; and our present invention relates to the mechanism by which we have adapted this discovery to practical use.

The novel features of our improved mechanism will be best understood after a description of the drawings, in which it is illustrated, and they are hereinafter clearly pointed out in the claims.

Reference is now had to the drawings, which illustrate our invention in the best form in which we have adapted it to use, and in which—

Figure 1:
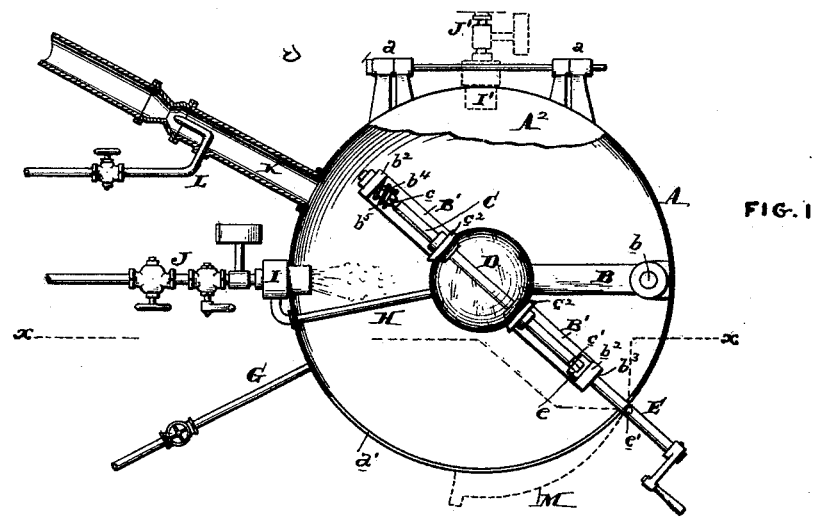
Figure 3:
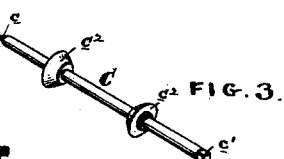
Figure 2:
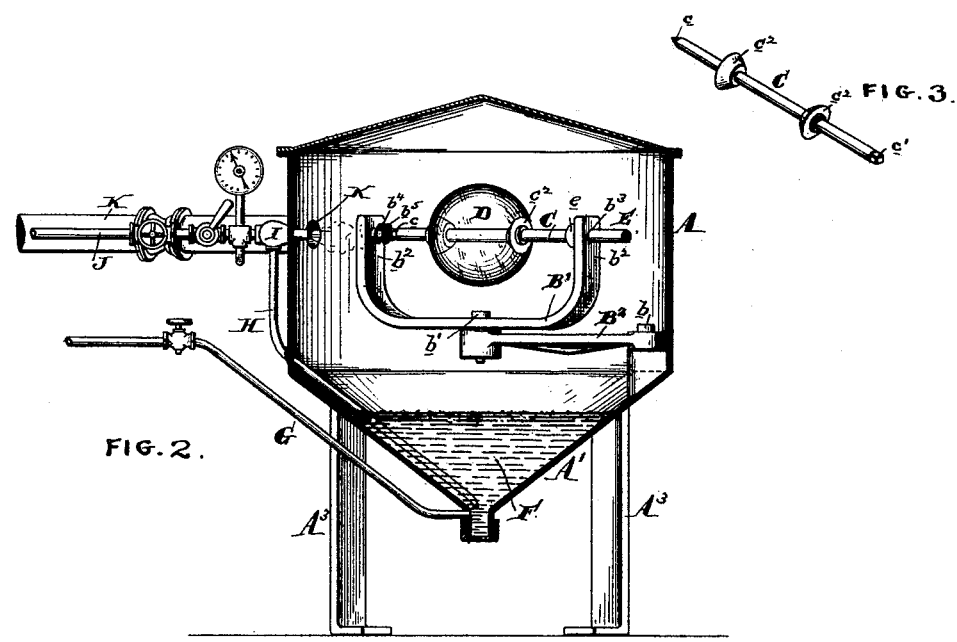

Figure 1 is a plan view of the improved apparatus with the covering partially removed; Fig. 2, an elevation of the apparatus on the section-line $x$ $x$ of Fig. 1; Fig. 3, a perspective view of a spindle on which glass globes are secured preparatory to inserting them in the apparatus, and Fig. 4 a view of a modified form of one part of our apparatus.

A is the casing in which glass to be frosted is inserted to undergo the necessary treatment. Connected with the bottom of this casing, and preferably forming the bottom thereof, as shown, is a receptacle A', made fluid-tight and cone-shaped, this receptacle being adapted to contain a mixture of powdered sand and water, with which the sand-blast gun is fed. In order to maintain this mixture in a homogeneous state and prevent the powdered sand from settling, an agitator should be used in receptacle A', a convenient device for this purpose being a steam-jet, as shown at G.

$A^2$ is the cover of casing A. For convenience of access to the casing we hinge it thereto, as shown at $a$ $a$.

I is the sand-blast gun, which we have not shown in detail, as it may be constructed in any usual way.

H is the supply-pipe of the gun I, leading from it to the receptacle A', and J is a steam-pipe leading into the gun I. Of course air or gas can be used as the impelling-jet; but steam is preferable. In order to act on two parts of the glass object being frosted, we contemplate using two jets, a second gun, as indicated at I', being adjusted in the casing, and it will be readily seen that with globular objects—such as gas-globes—such an arrangement would be very efficient. In order to draw the steam from the inside of the casing A, we provide a pipe K, in which a steam-pipe L opens, as shown, so as to create suction within it.

Referring now to our device for holding and manipulating the glass object to be frosted while it is being treated in the casing, C is a spindle on which a round object—such as a lamp globe or shade—can be secured, $c^2$ $c^2$ being clamps, one of which is removable, and between which the globe or shade is held on the spindle. One end $c$ of the spindle is preferably pointed, while the other end $c'$ is adapted to fit in or onto the end of a shaft or rod E, hereinafter described. As shown, it is squared off to fit in a socket in said rod.

B' is a spindle-holding device in which the spindle is gripped and held, a socket being formed to receive it in one of the arms $b^2$ of the holder, or, as in the drawings, in a projecting pin attached to said socket. In the opposite arm $b^2$ of the holder a journal-bearing $b^3$ is formed to receive the end of the handle-rod E, said end $e$ being formed to engage the end $c'$ of the spindle. Preferably the holder B' is made of metal having a spring, so that its upright arms $b^2$ $b^2$ can be sprung apart from each other to allow the insertion and removal of the spindle C; or a socket-pin $b^4$ may be used with the spring—such as $b^5$—to serve the same purpose. The spindle-holder B' is pivoted on $b'$, a sustaining-rod attached to the casing A. Preferably this rod is made, as shown in Figs. 1 and 2, with a pivotal attachment to the casing at $b$, so as to give longitudinal movement to the spindle-holder.

Figure 4:
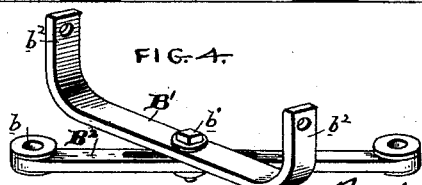

Instead of using the pivoted arm as a support, the holder may be pivoted in a slotted bar $B^2$, as shown in Fig. 4, this being an evident equivalent for the first-described arrangement. The handle E extends through a slot $a'$ in the casing, and should have a crank-handle attached to it, as shown, by means of which the globe D, held on the spindle, can be rotated on its own axis, rotated on the pivot $b'$ of the holder, or given a longitudinal motion or any combination of these motions at will. Where intricate forms are being ground it is desirable that the motion should be made with accuracy, so as to bring the different parts of the surface to the proper angle with the blast, and to accomplish this we have provided a templet M, to engage with a pin or collar $e'$ on the handle. The form of the templet, which of course will vary with the object being ground, will insure the proper movement being given to the globe.

In referring to the grinding material as sand, we do not wish to be understood as referring only to silicious sand, but to any fine hard particles suitable for use in the sand-blast.

We have found in the use of our above-described apparatus that a jet of very high pressure may be used with good effect, frosting being produced very rapidly and without danger of cutting through the glass, as is the case where dry sand is employed, and, as above noted, the frosting produced is of a much finer character than it has heretofore been practicable to produce on a glass surface, so fine that when subsequently treated with fluoric acid a perfectly smooth and brilliant surface of clear glass results.

The receptacle or reservoir for containing the powdered sand and water may be either above or below the level of the gun, and it is not of course essential that it should be the same receptacle as that into which the mixture falls after striking the glass being operated upon.

The supply for the jet may be drawn in by the ejector-like action of the steam-jet, or it may flow in by gravity or be forced in by a pump.

Having now described our invention, what we claim as new, and desire to secure by Letters Patent, is—

1. In a machine for frosting glass by means of the sand-blast, the combination of a casing A, a fluid-tight receptacle for containing powdered cutting material and water, a sand-blast gun connected with the receptacle for cutting material and water, so as to draw its supply from it, and a device for holding to glass to be frosted situated in casing A, all substantially as specified.

2. In a machine for frosting glass by means of the sand-blast, the combination of a casing A, a fluid-tight receptacle for containing powdered cutting material and water, an agitator for maintaining the mixture of fine sand and water, a sand-blast gun connected with the receptacle for cutting material and water so as to draw its supply from it, and a device for holding to glass to be frosted situated in casing A, all substantially as specified.

3. In a machine for frosting glass by means of the sand-blast, the combination of a casing A, a spindle-holding device B', pivoted on a support on the casing, as specified, and having spring-arms $b^2$, or equivalent mechanism, as described, to grip and hold a spindle, and a handle-rod E, journaled in one arm of the spindle-holder B', and having its inner end $e$ formed to engage the spindle secured in the said holder, all substantially as and for the purpose specified.

4. In a machine for frosting glass by means of the sand-blast, the combination of a casing A, a pivoted bar B, or equivalent mechanism, as described, for sustaining and permitting longitudinal motion in a spindle-holder, a spindle-holding device B', pivoted on said bar B or its equivalent, and having spring-arms $b^2$, or equivalent mechanism, as described, to grip and hold a spindle, and a handle-rod E, journaled in one arm of the spindle-holder B', and having its inner end $e$ formed to engage the spindle secured in the said holder, all substantially as and for the purpose specified.

5. In a machine for frosting glass by means of the sand-blast, the combination of a casing A, a supporting-bar B, pivoted to the casing at $b$, a spindle-holding device B', pivoted on the end of bar B at $b'$, and having spring-arms $b^2$, or equivalent mechanism, as described, to grip and hold a spindle, and a handle-rod E, journaled in one arm of the spindle-holder B', and having its inner end $e$ formed to engage the spindle secured in the said holder, all substantially as and for the purpose specified.

6. In a machine for frosting glass by means of the sand-blast, the combination of a casing A to contain the object to be treated, and having a cone-shaped fluid-tight bottom A', with a sand-blast gun I, a supply-tube H, leading from the bottom of the casing to the gun, and a steam-jet G, leading to the bottom of the casing to serve as an agitator, all substantially as and for the purpose specified.

7. In a machine for frosting glass by means of the sand-blast, the combination of a casing A to contain the object to be treated, and having a cone-shaped fluid-tight bottom A', with a sand-blast gun I, a supply-tube H, leading from the bottom of the casing to the gun, a pipe K, with steam-jet L to draw steam from the casing, and a steam-jet G, leading to the bottom of the casing to serve as an agitator, all substantially as and for the purpose specified.

8. In a machine for frosting glass by means of the sand-blast, the combination of a casing A, with one or more sand-blast guns leading into it, a supporting-bar B or its equivalent, a spindle-holder B', pivoted and longitudinally movable on bar B, a handle-rod E, journaled in one arm of spindle-holder B' and having a shoulder $e'$, and a templet M, secured to casing A, and adapted to engage with shoulder $e'$ of handle-rod E, all substantially as and for the purpose specified.

B. C. TILGHMAN.
R. A. TILGHMAN.

Witnesses:
GEORGE HOUSE,
FRANCIS T. CHAMBERS.